(12) United States Patent
Liu et al.

(10) Patent No.: US 11,723,360 B2
(45) Date of Patent: Aug. 15, 2023

(54) APPLICATION OF METHYLMALONIC ACID IN THE PREPARATION OF NEMATODE INSECTICIDES

(71) Applicant: Hubei Biopesticide Engineering Research Center, Hubei (CN)

(72) Inventors: Xiaoyan Liu, Hubei (CN); Wei Fang, Hubei (CN); Yong Min, Hubei (CN); Daye Huang, Hubei (CN); Ronghua Zhou, Hubei (CN); Guangyang Zhang, Hubei (CN); Ben Rao, Hubei (CN); Xianqing Liao, Hubei (CN); Fang Liu, Hubei (CN); Wei Chen, Hubei (CN); Kaimei Wang, Hubei (CN); Ziwen Yang, Hubei (CN); Liqiao Shi, Hubei (CN)

(73) Assignee: Hubei Biopesticide Engineering Research Center, Wuhan (CN)

( * ) Notice: Subject to any disclaimer, the term of this patent is extended or adjusted under 35 U.S.C. 154(b) by 0 days.

(21) Appl. No.: 17/038,920

(22) Filed: Sep. 30, 2020

(65) Prior Publication Data

US 2021/0015094 A1 Jan. 21, 2021

Related U.S. Application Data

(63) Continuation of application No. PCT/CN2019/000143, filed on Jul. 11, 2019.

(30) Foreign Application Priority Data

Jul. 11, 2018 (CN) .......................... 201810756891.1

(51) Int. Cl.
*A01N 33/12* (2006.01)
*A01N 31/02* (2006.01)

(52) U.S. Cl.
CPC ............. *A01N 33/12* (2013.01); *A01N 31/02* (2013.01)

(58) Field of Classification Search
None
See application file for complete search history.

(56) References Cited

U.S. PATENT DOCUMENTS

| 4,256,126 A | 3/1981 | Seligman et al. |
| 5,512,200 A | 4/1996 | Garcia |
| 2004/0077499 A1 | 4/2004 | Graham et al. |

OTHER PUBLICATIONS

C. Djian et al., "Nematocidal properties of carboxylic acids and derivatives," Pesticide Biochemistry and Physiology, vol. 50, pp. 229-239 (1994).

(Continued)

*Primary Examiner* — Bethany P Barham
*Assistant Examiner* — Barbara S Frazier
(74) *Attorney, Agent, or Firm* — Mei & Mark LLP; Manni Li

(57) ABSTRACT

By determining the lethality rate to *Meloidogyne incognita* and *Caenorhabditis elegans*, it was found that the methylmalonic acid has a better nematicidal effect on the *Caenorhabditis elegans*, with the $LC_{50}$ being 13.11 and 1.20 for the *Meloidogyne incognita* and the *Caenorhabditis elegans*, respectively. After compounding the methylmalonic acid with betaine, the $LC_{50}$ was 2.85 and 0.27 for the *Meloidogyne incognita* and the *Caenorhabditis elegans*, respectively. Meanwhile, the methylmalonic acid also has an inhibiting effect on *Pseudomonas solanacearum* and *Erwinia carotovora*. The preparation of the methylmalonic acid provides a new choice for preparing novel biocontrol agents against the root-knot nematodes.

5 Claims, 1 Drawing Sheet

(56) References Cited

OTHER PUBLICATIONS

Aude S. Peden et al., "Betaine acts on a ligand-gated ion channel in the nervous system of the nematode C. elegans," Nat. Neurosci., vol. 16(12), pp. 1794-1801 (Dec. 2013).

Liu, Dan-Dan, "The lethal effect and action mechanism of acids compounds against the plant parasitic nematodes," Shenyang Agriculture University, doctorate dissertation (Jun. 6, 2011), (Abstract Only).

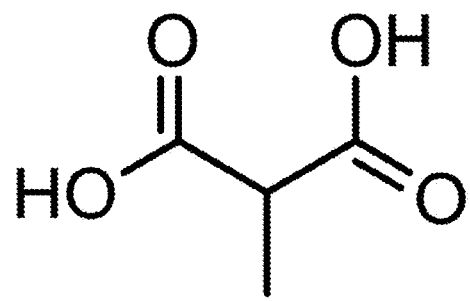
FIG. 1
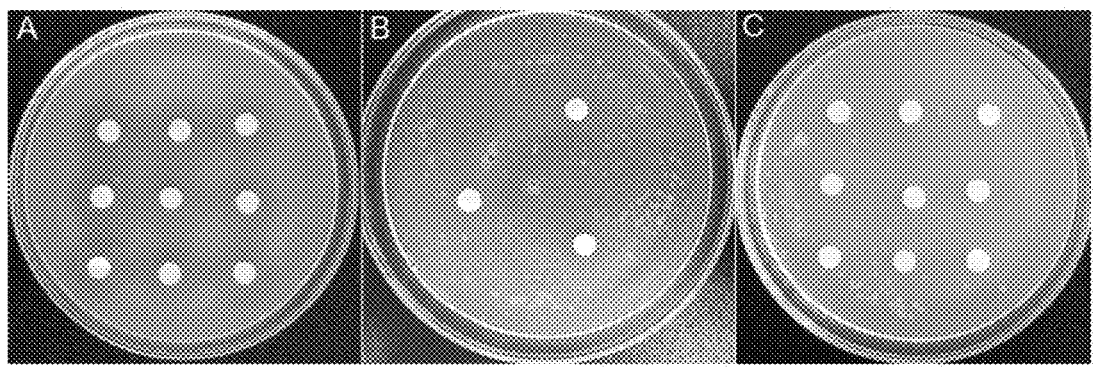
FIG. 2A        FIG. 2B        FIG. 2C
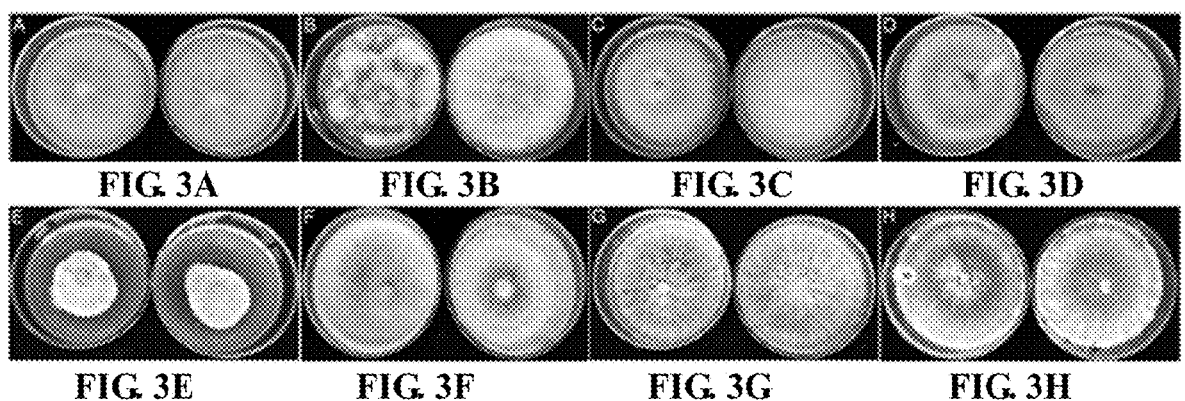
FIG. 3A    FIG. 3B    FIG. 3C    FIG. 3D
FIG. 3E    FIG. 3F    FIG. 3G    FIG. 3H

APPLICATION OF METHYLMALONIC ACID IN THE PREPARATION OF NEMATODE INSECTICIDES

CROSS-REFERENCE TO RELATED APPLICATIONS

The subject application is a continuation of PCT/CN2019/000143 filed on Jul. 11, 2019, which claims priority on Chinese Application No. CN201810756891.1 filed on Jul. 11, 2018 in China. The contents and subject matter of the PCT international application and the Chinese priority application are incorporated herein by reference.

BACKGROUND OF THE INVENTION

Technical Field

The present invention belongs to the technical field of agricultural microbiology, and in particular, relates to application of methylmalonic acid in the preparation of nematode insecticides.

Description of Related Art

At present, there are more than 3000 species of nematodes harmful to plants, and more than 40 species have been found in China. Among them, root-knot nematodes are one of the most harmful nematodes to crops. The small root-knot nematodes live inside plants or in the soil, and may move with rains, labor operations, and transfers of diseased plants. They are extremely difficult to prevent and control. It is incompletely estimated that the economic losses caused by nematodes is about 80 billion USD across the world. In the tropical and subtropical regions, the root-knot nematode diseases are severe and have reduced crop production by more than 80%.

The root-knot nematode (*Meloidogyne*) is a dioecious omnivorous plant-pathogen nematode of a highly specialized form. Its life history includes three stages, namely, an egg stage, a larva stage and an adult stage. Under suitable conditions (20-30° C.), eggs are divided into about 20 cells after 2 days to enter a blastula stage, and then enter a gastrul stage on the $4^{th}$-$5^{th}$ day after 2 days. Afterwards, scalpella emerge first on the $4^{th}$-$5^{th}$ day, and the eggs develop into first-instar larvae, which develop into second-instar larvae after resting, first molting and hatching. The second-instar larvae are the only effective instar of the root-knot nematodes to infect plants, where the second-instar larvae invade from root tips of plants and develop into adults after two moltings. Then, male adults return to the soil, and female adults lay eggs and reproduce offspring. Most root-knot nematodes only undergo female parthenogenesis. The eggs, oocysts or second-instar larvae of the root-knot nematodes mainly overwinter in soil along with residues of diseased plants. When the atmospheric temperature reaches above 10° C., the larvae can be hatched from the eggs. With water-repellent and chemotactic properties, the root-knot nematodes may favorably move in a humid environment, but are inhibited in survival and activity in extremely humid and dry environments. When the moisture content in field is maintained at 50%-80%, it is favorable for the female adult to lay eggs. The exudates of plant root systems are highly attractive for the root-knot nematodes; therefore, the root-knot nematodes are concentrated in a soil layer of 10-30 cm, and gathered around plant rhizospheres at the farming layer. The second-instar larvae are less active in water, and can move in the soil with a limited range of activity, which is not more than 2 meters. The root-knot nematodes have good adaptability to the temperature. At the temperature of 15-30° C., it is suitable for the root-knot nematodes to grow and reproduce. At the high temperature above 40° C. and at the low temperature below 5° C., the survival of the second-instar larvae and the hatching of the eggs in oocysts may be inhibited, and the female larvae cannot develop fully.

For the diseases caused by the root-knot nematodes, the plant protection policy of prevention-dominated comprehensive control must be strictly implemented. Their harms can be effectively prevented only by paying special attention to the agricultural and physical prevention and control measures and in combination with chemical and biological prevention and control. There are four main prevention and control methods as follows: (1) agricultural prevention and control: including paddy-upland rotation, grafting, soil improvement, adjustment of sowing time, planting of disease-resistant varieties, etc.; (2) physical prevention and control: mainly including removal of residues of diseased plants, soil treatment, seed treatment, etc.; (3) chemical prevention and control: including application of chemical nematode insecticides for prevention and control; and (4) biological prevention and control: as a prevention and control method that has developed rapidly in recent years, it is to control the number of the nematodes and restrict the losses caused by the nematodes by using their natural enemies. This is relatively safe for humans, animals and the environment, and has a broad prospect of application. For the biological prevention and control, *Bacillus thuringiensis* (Bt) has been used broadly at present. Besides Bt, there are *Psteuriapenetrans, Pseudomonas* spp., and *Bacillus firmus* that is found in recent years, as well. Methylmalonic acid (also known as methyl maleic acid or isosuccinic acid) in the invention is a small-molecule organic acid with a molecular formula of $C_4H_6O_4$, and is soluble in water, alcohol and ether in terms of the physical properties. The methylmalonic acid is produced by decomposing methylmalonyl coenzyme A resulting from a metabolic process of propionic acid, thymine and the like. It is excreted from urine when the deficiency of vitamin B12 occurs and the metabolism of methylmalonyl coenzyme A is blocked. This application found for the first time that the methylmalonic acid has a nematicidal activity.

BRIEF SUMMARY OF THE INVENTION

An object of the invention is to provide application of the methylmalonic acid in the preparation of nematode insecticides, especially in an insecticide against *Caenorhabditis elegans* and/or an insecticide against the root-knot nematodes. The methylmalonic acid has a molecular formula of $C_4H_6O_4$, with a molecular weight of 118.09. This small-molecule organic acid has the nematicidal activity, and has a chemical formula as follows:

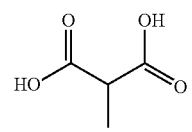

To achieve the object described above, a technical solution employed by the invention is as follows.

For the application of the methylmalonic acid in the preparation of the nematode insecticides, an application process includes the preparation of nematode insecticides by using the methylmalonic acid as a main component or as one of the main components;

In the application above, preferably, the nematodes are *Meloidogyne incognita* or *Caenorhabditis elegans*.

In the applications above, preferably, the methylmalonic acid and the betaine are compounded to prepare the nematicides.

For the application of the methylmalonic acid in the preparation of microbicides against plant pathogens, an application process includes the preparation of microbicides against plant pathogens by using the methylmalonic acid as a main component or as one of the main components;

In the application above, preferably, the plant pathogens are *Pseudomonas solanacearum* or *Erwinia carotovora*.

In the applications above, preferably, the methylmalonic acid and the betaine are compounded to prepare the microbicides against plant pathogens.

Compared with the prior art, the invention has the following characteristics.

The invention reports for the first time that the methylmalonic acid has the nematicidal activity, which provides a new choice for the preparation of novel biocontrol agents against the root-knot nematodes.

A nematicide prepared from the methylmalonic acid has the advantages of high efficiency, low toxicity and good sustainability, and also has a microbicidal effect against the plant pathogens.

BRIEF DESCRIPTION OF THE DRAWINGS

FIG. 1 is a schematic diagram of a chemical structure of methylmalonic acid.

FIGS. 2A to 2C are diagrams showing microbicidal effects of the methylmalonic acid against bacterial plant pathogens in the present invention, where FIG. 2A shows the microbicidal effect against *Ralstonia solanacearum*; FIG. 2B shows the microbicidal effect against *Erwinia carotovora*; and FIG. 2C shows the microbicidal effect against black spot of walnut.

FIGS. 3A to 3H are diagrams showing microbicidal effects of the methylmalonic acid against fungal plant pathogens, where FIG. 3A shows the microbicidal effect against *Phytophthora capsici*; FIG. 3B shows the microbicidal effect against *Botrytis cinerea*; FIG. 3C shows the microbicidal effect against *Fusarium oxysporum*; FIG. 3D shows the microbicidal effect on *Alternaria solani*; FIG. 3E shows the microbicidal effect against *Corynespora cassiicola*; F. microbicidal effect on *Pestalotiopsis theae*; and FIG. 3G shows the microbicidal effect against *Rhizoctonia solani*; H. Microbicidal effect against *Sclerotinia sclerotiorum*.

DETAILED DESCRIPTION OF THE INVENTION

Unless otherwise stated, experimental methods in the embodiments below are all conventional microbiological operation methods that have been reported.

Example 1

In the example, structural verification of nematicidal methylmalonic acid is conducted as follows: Methylmalonic acid was purchased from Sigma. Nuclear Magnetic Resonance (NMR) was used to detect the structure of the methylmalonic acid. Among others, hydrogen spectra (H NMR) and carbon spectra ($^{13}C$ NMR) are respectively determined by using deuterium water (D2O) as a solvent, with the NMR data shown in Table 1-1.

TABLE 1-1

Two-dimensional NMR spectra data of methylmalonic acid

| No. | $\delta_H$(J in Hz) | $\delta c$ |
|---|---|---|
| 1 | | 174.2 s |
| 2 | 3.41(1H, dd, J = 13.7, 7.2) | 45.9 d |
| 3 | | 174.2 s |
| 4 | ~1.19 (3H, overlapped) | 12.8 q |

Example 2

Application of methylmalonic acid in the preparation of insecticides against root-knot nematodes, with an application process as follows:

Roots and knots infected by the nematodes were picked from the roots of tomatoes. Egg masses were placed in a 96-well plate for incubation at 20° C. to observe the hatching of the root-knot nematodes. The nematodes were washed with sterile water; 20 μL of 1 mg/mL methylmalonic acid aqueous solution was added to the 96-well plate, and at the same time, purified water was added; the final concentrations of the methylmalonic acid in the well plate was adjusted to 1000, 100, 25, 16.67, 12.5, 10.1 m/mL in order; and 40 nematodes were added to each well; a bioassay system was 200 μL in total, with the purified water as a control, and 3 times repeated for each group. They were cultured in an incubator at 16° C. A $LC_{50}$ value of the methylmalonic acid against the *Meloidogyne incognita* was 13.11 m/mL as shown in Table 2-1.

TABLE 2-1

Insecticidal activity of methylmalonic acid against *Meloidogyne incognita*

| Dose (pg/mL) | Lethality Rate (%) | Logarithmic Dose | Probability Unit | Regression Equation | Confidence Interval | Medial Lethal Concentration ($LC_{50}$, ug/mL) |
|---|---|---|---|---|---|---|
| 1000 | 97.4 | 3.000 | 6.954 | Y = 3.5248 + 1.3200X | 0.88~194.67 | 13.11 |
| 100 | 97.5 | 2.000 | 6.965 | (r = 0.8754) | (a = 0.05) | |
| 50 | 80 | 1.699 | 5.840 | | | |
| 25 | 81.1 | 1.398 | 5.883 | | | |
| 16.67 | 76.3 | 1.222 | 5.719 | | | |
| 12.5 | 29.3 | 1.097 | 4.458 | | | |
| 10 | 12.5 | 1.000 | 3.850 | | | |
| 1 | 8.1 | 0.000 | 3.598 | | | |

With the method above, the applicant tested the insecticidal effect of betaine, and based on test results, a $LC_{50}$ value of the betaine against the *Meloidogyne incognita* was 75.22 m/ml.

Example 3

Application of methylmalonic acid in the preparation of insecticides against *Caenorhabditis elegans*, with an application process as follows:

20 μL of 1 mg/mL methylmalonic acid aqueous solution was added to the 96-well plate, and at the same time, purified water was added; the final concentrations of the methylmalonic acid in the well plate was adjusted to 1000, 100, 25, 16.67, 12.5, 10.1 m/mL in order; 40 nematodes were added to each well; and a bioassay system was 200 μL in total, with the purified water as a control. The process was repeated 3 times for each group. They were cultured in an incubator at 16° C. A $LC_{50}$ value of the methylmalonic acid against the *Caenorhabditis elegans* was 1.20 m/mL as shown in Table 3-1.

TABLE 3-1

Insecticidal activity of methylmalonic acid against *Caenorhabditis elegans*

| Dose (pg/mL) | Lethality Rate (%) | Logarithmic Dose | Probability Unit | Regression Equation | Confidence Interval | Medial Lethal Concentration ($LC_{50}$, ug/mL) |
|---|---|---|---|---|---|---|
| 1000 | 97.5 | 3.000 | 6.965 | Y = 4.9250 + 0.9343X | 0.04~35.37 | 1.20 |
| 100 | 97.4 | 2.000 | 6.954 | (r = 0.8103) | (a = 0.05) | |
| 50 | 97.5 | 1.699 | 6.965 | | | |
| 25 | 90.5 | 1.398 | 6.309 | | | |
| 16.67 | 94.9 | 1.222 | 6.628 | | | |
| 12.5 | 94.9 | 1.097 | 6.628 | | | |
| 10 | 70.0 | 1.000 | 5.520 | | | |
| 1 | 18.4 | 0.000 | 4.097 | | | |

With the method above, the applicant tested the insecticidal effect of betaine, and based on test results, a $LC_{50}$ value of the betaine against the *Caenorhabditis elegans* was 14.75 μg/ml.

Example 4. Microbicidal Activity of Methylmalonic Acid Against Bacterial Plant Pathogens

*Ralstonia solanacearum*, *Erwinia carotovora* and *Xanthomonas campestris* were activated through scribing to obtain single colonies, which were picked and inoculated into an LB liquid culture medium for activation. With an agar plate diffusion method, 1% pathogenic bacteria was added to the culture medium which was then poured into a culture dish; a piece of filter paper (with a diameter of 6 mm) was placed in the culture dish; 5 μL of 0.1 g/mL methylmalonic acid was added to the piece of filter paper, and then incubated at 30° C., with water as a negative control. The process was repeated 3 times. The results of microbicidal experiments showed that the methylmalonic acid showed a microbicidal activity against the *Pseudomonas solanacearum* and *Erwinia carotovora*, and the microbicidal activity against the *Pseudomonas solanacearum* was higher than that against the *Erwinia carotovora* (Table 4-1 and FIGS. 2A to 2C).

TABLE 4-1

Microbicidal activity of methylmalonic acid against bacterial plant pathogens

| Latin Name | Diseases Caused | Diameter of Inhibition Zone | Microbicidal Effect |
|---|---|---|---|
| *Ralstonia solanacearum* | Bacterial wilt of tomatoes | 12 mm | ++ |
| *Erwinia carotovora* | Hollow stalk of tomatoes | 6.9 mm | + |
| *Xanthomonas campestris* | Black spot of walnuts | 0 | − |

−: without microbicidal activity;
+: with microbicidal activity, the diameter of an inhibition zone being less than 10 mm;
++ with microbicidal activity, and the diameter of an inhibition zone being more than 10 mm.

Example 5. Microbicidal activity of methylmalonic acid against fungal plant pathogens The mycelia of fungal pathogens were picked and inoculated to a PDA medium for activation. With a mycelium growth rate method, 200 μg/mL methylmalonic acid mother liquid was prepared using sterile water; 4.5 mL of sterile water was added to 0.5 mL of the mother liquid and evenly mixed; fungal masses were picked and placed in a PDA culture medium plate center, and then cultured at 28° C. to observe the results, with the sterile water as a negative control. After the plate was fully covered with the control mycelia, the diameters of the control and treatment colonies were counted with a crossing method. The results of microbicidal experiments showed that the methylmalonic acid showed no microbicidal activity against the fungal plant pathogens (Table 5-1 and FIGS. 3A to 3H).

TABLE 5-1

Microbicidal activity of methylmalonic acid against fungal plant pathogens

| Latin Name | Diseases Caused | Microbicidal Effect |
|---|---|---|
| *Phytophthora capsici* | *Phytophthora* blight on peppers | − |
| *Botrytis cinerea* | Grey mold of cucumber | − |
| *Fusarium oxysporum* | Tomato wilt | − |
| *Alternaria solani* | Potato early blight | − |
| *Corynespora cassiicola* | *Corynespora* leaf spot of cucumber | − |
| *Pestalotiopsis theae* | *Pestalotiopsis* leaf spot of tea | − |

TABLE 5-1-continued

Microbicidal activity of methylmalonic acid
against fungal plant pathogens

| Latin Name | Diseases Caused | Microbicidal Effect |
|---|---|---|
| Rhizoctonia solani | Rice sheath blight disease | − |
| Sclerotinia sclerotiorum | Sclerotinia rot of colza | − |

+: effective;
−: ineffective.

Example 6

Application of methylmalonic acid compounded with betaine in the preparation of insecticides against root-knot nematodes, with an application process as follows:

Roots and knots infected by the nematodes were picked from the roots of tomatoes. Egg masses were placed in a 96-well plate for incubation at 20° C. to observe the hatching of the *Meloidogyne*. The nematodes were washed with sterile water; 20 μL of 1 mg/mL mixed aqueous solution of methylmalonic acid and betaine (mass ratio: 1:1) was added to the 96-well plate, and at the same time, purified water was added; the final concentrations of the compounded solution in the well plate was adjusted to 1000, 100, 25, 16.67, 12.5, 10, 1, 0.5, 0.25 μg/mL in order; and 40 nematodes were added to each well; a bioassay system was 200 μL in total, with the purified water as a control, and 3 times repeated for each group. They were cultured in an incubator at 16° C. A $LC_{50}$ value of the compounded solution of methylmalonic acid and betaine against the *Meloidogyne incognita* was 2.85 μg/mL as shown in Table 6-1.

TABLE 6-1

Insecticidal activity of methylmalonic acid compounded with betaine against *Meloidogyne incognita*

| Dose (ug/mL) | Lethality Rate (%) | Logarithmic Dose | Probability Unit | Regression Equation | Confidence Interval | Medial Lethal Concentration ($LC_{50}$, ug/mL) |
|---|---|---|---|---|---|---|
| 1000 | 97.4 | 3.000 | 6.943 | Y = 4.5732 + 0.9387X | 0.06~133.53 | 2.85 |
| 100 | 95.0 | 2.000 | 6.640 | (r = 0.9210) | (a = 0.05) | |
| 50 | 92.3 | 1.699 | 6.432 | | | |
| 25 | 95.0 | 1.398 | 6.640 | | | |
| 16.67 | 87.5 | 1.222 | 6.155 | | | |
| 12.5 | 53.7 | 1.097 | 5.093 | | | |
| 10 | 46.2 | 1.000 | 4.903 | | | |
| 1 | 37.5 | 0.000 | 4.680 | | | |
| 0.5 | 22.2 | −0.301 | 4.237 | | | |
| 0.25 | 13.2 | −0.602 | 3.878 | | | |

The above results showed that a synergic nematode killing effect was achieved by mixing the methylmalonic acid and the betaine. As can be seen from Example 2, the single use of the methylmalonic acid resulted in an LC50 of 13.11 μg/mL against the *Meloidogyne incognita*; and the single use of the betaine resulted in an LC50 of 75.22 μg/ml against the *Meloidogyne incognita*. The compounded methylmalonic acid and betaine at the mass ratio of 1:1 resulted in an LC50 of 2.85 μg/mL against the *Meloidogyne incognita*, and the insecticidal efficiency was significantly increased.

Example 7

Application of methylmalonic acid compounded with betaine in the preparation of insecticides against *Caenorhabditis elegans*, with an application process as follows:

20 μL of 1 mg/mL mixed aqueous solution of methylmalonic acid and betaine (mass ratio: 1:1) was added to the 96-well plate, and at the same time, purified water was added; the final concentrations of the compounded solution in the well plate was adjusted to 1000, 100, 25, 16.67, 12.5, 10, 1, 0.5, 0.25 μg/mL in order; and 40 nematodes were added to each well; a bioassay system was 200 μL in total, with the purified water as a control, and 3 times repeated for each group. They were cultured in an incubator at 16° C. A $LC_{50}$ value of the methylmalonic acid against the *Caenorhabditis elegans* was 0.27 μg/mL as shown in Table 7-1.

TABLE 7-1

Insecticidal activity of methylmalonic acid compounded with betaine against *Caenorhabditis elegans*

| Dose (ug/mL) | Lethality Rate (%) | Logarithmic Dose | Probability Unit | Regression Equation | Confidence Interval | Medial Lethal Concentration ($LC_{50}$, ug/mL) |
|---|---|---|---|---|---|---|
| 1000 | 97.5 | 3.000 | 6.965 | Y = 5.4258 + 0.7483X | 0.00~28.53 | 0.27 |
| 100 | 97.5 | 2.000 | 6.965 | (r = 0.9014) | (a = 0.05) | |
| 50 | 97.4 | 1.699 | 6.954 | | | |
| 25 | 97.4 | 1.398 | 6.954 | | | |
| 16.67 | 95.0 | 1.222 | 6.640 | | | |
| 12.5 | 95.2 | 1.097 | 6.666 | | | |
| 10 | 82.1 | 1.000 | 5.922 | | | |
| 1 | 70.7 | 0.000 | 5.542 | | | |
| 0.5 | 51.4 | −0.301 | 5.037 | | | |
| 0.25 | 30.0 | −0.602 | 4.480 | | | |

The above results showed that a synergic nematode killing effect was achieved by mixing the methylmalonic acid and the betaine. As can be seen from Example 3, the single use of the methylmalonic acid resulted in an LC50 of 1.20 μg/mL against the *Caenorhabditis elegans*; and the single use of the betaine resulted in an LC50 of 14.75 μg/ml against the *Caenorhabditis elegans*. The compounded methylmalonic acid and betaine at the mass ratio of 1:1 resulted in an LC50 of 0.27 μg/mL against the *Caenorhabditis elegans*, and the insecticidal efficiency was significantly increased.

Example 8. Microbicidal Activity of Methylmalonic Acid Compounded with Betaine Against Bacterial Plant Pathogens

*Ralstonia solanacearum, Erwinia carotovora* and *Xanthomonas campestris* were activated through scribing to obtain single colonies, which were picked and inoculated into an LB liquid culture medium for activation. With an agar plate diffusion method, 1% pathogenic bacteria was added to the culture medium which was then poured into a culture dish; a piece of filter paper (with a diameter of 6 mm) was placed in the culture dish; 5 μL of 0.1 mg/mL mixed aqueous solution of methylmalonic acid and betaine (mass ratio: 1:1) was added to the piece of filter paper, and then incubated at 30° C., with water as a negative control. The process was repeated 3 times. The results of microbicidal experiments showed that the compounded solution showed a microbicidal activity against the *Pseudomonas solanacearum* and *Erwinia carotovora*, but no microbicidal activity against the *Xanthomonas campestris* (Table 8-1).

TABLE 8-1

Microbicidal activity of methylmalonic acid compounded with betaine against bacterial plant pathogens

| Latin Name | Diseases Caused | Diameter of Inhibition Zone | Microbicidal Effect |
|---|---|---|---|
| *Ralstonia solanacearum* | Bacterial wilt of tomato | 6.5 mm | + |
| *Erwinia carotovora* | Hollow stalk of tomato | 3.1 mm | + |
| *Xanthomonas campestris* | Black spot of walnut | 0 | − |

−: without microbicidal activity;
+: with microbicidal activity, the diameter of an inhibition zone being less than 10 mm.

Example 9. Microbicidal Activity of Methylmalonic Acid Compounded with Betaine Against Fungal Plant Pathogens The mycelia of fungal pathogens were picked and inoculated to a PDA medium for activation. With a mycelium growth rate method, 200 μg/mL mixed aqueous solution of methylmalonic acid and betaine (mass ratio: 1:1) was prepared using sterile water; 4.5 mL of sterile water was added to 0.5 mL of the mixed solution and evenly mixed; fungal masses were picked and placed in a PDA culture medium plate center, and then cultured at 28° C. to observe the results, with the sterile water as a negative control. After the plate was fully covered with the control mycelia, the diameters of the control and treatment colonies were counted with a crossing method. The results of microbicidal experiments showed that the compounded solution showed no microbicidal activity against the fungal plant pathogens (Table 9-1).

TABLE 9-1

Microbicidal activity of methylmalonic acid against fungal plant pathogens

| Latin Name | Diseases Caused | Microbicidal Effect |
|---|---|---|
| *Phytophthora capsici* | *Phytophthora* blight on peppers | − |
| *Botrytis cinerea* | Grey mold of cucumber | − |
| *Fusarium oxysporum* | Tomato wilt | − |
| *Alternaria solani* | Potato early blight | − |
| *Corynespora cassiicola* | *Corynespora* leaf spot of cucumber | − |
| *Pestalotiopsis theae* | *Pestalotiopsis* leaf spot of tea | − |
| *Rhizoctonia solani* | Rice sheath blight disease | − |
| *Sclerotinia sclerotiorum* | *Sclerotinia* rot of colza | − |

+: effective;
−: ineffective.

We claim:

1. A nematode insecticide, comprising methylmalonic acid, and betaine, wherein the nematode insecticide is in a form of an aqueous composition; the methylmalonic acid and betaine are compounded; a concentration of the compounded methylmalonic acid and betaine in the aqueous composition is 0.25 μg/mL or more; and a mass ratio of the methylmalonic acid to the betaine is 1:1.

2. A method for treating and controlling nematode infection according to claim 1, comprising preparing the nematode insecticide according to claim 1, applying the nematode insecticide to a plant or soil infected with nematodes, and contacting and killing the nematodes with the nematode insecticide.

3. The method according to claim 2, wherein the nematode infection is caused by *Meloidogyne incognita* or *Caenorhabditis elegans*.

4. The method according to claim 2, wherein the concentration of the compounded methylmalonic acid and betaine in the aqueous composition is 2.85 µg/mL or more.

5. The method according to claim 2, wherein the concentration of the compounded methylmalonic acid and betaine in the aqueous composition is 0.27 µg/mL or more.

* * * * *